Jan. 21, 1936.  R. J. L. MOINEAU  2,028,407
GEAR MECHANISM
Filed March 24, 1933
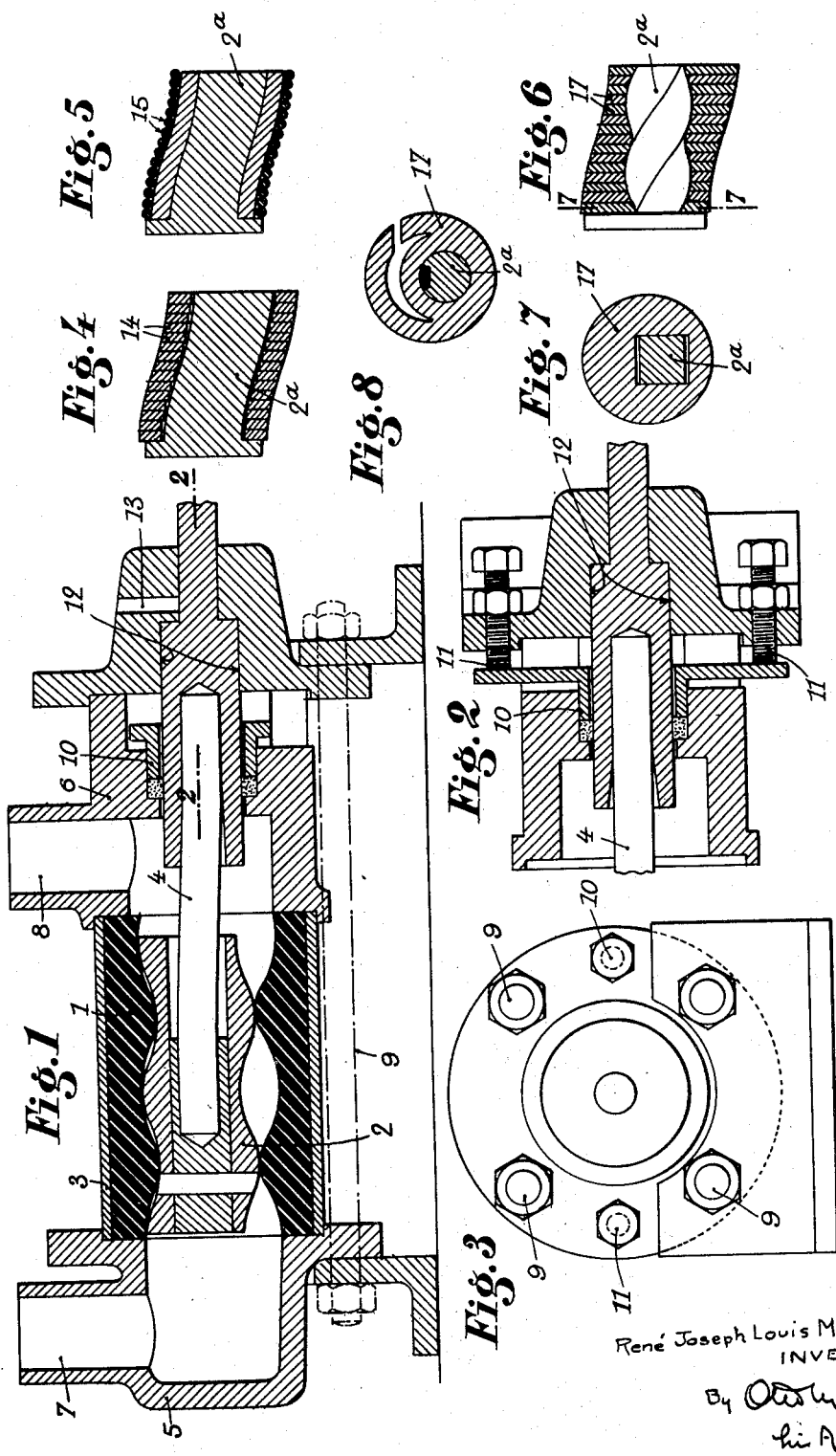
René Joseph Louis Moineau
INVENTOR Patented Jan. 21, 1936

2,028,407

UNITED STATES PATENT OFFICE 2,028,407

GEAR MECHANISM

René Joseph Louis Moineau, Paris, France

Application March 24, 1933, Serial No. 662,483
In France April 29, 1932

5 Claims. (Cl. 103—117)

The present invention relates to improvements in gear mechanisms and chiefly in those which are adapted to be used as pumps, motors, compressors, etc.

In conformity to the invention, one at least of the elements forming the mechanism is wholly or partially elastic, yielding, or adapted to receive a slight dispacement, in order to assure the contact between all of the gear elements without appreciable play and upon a great length.

The invention is chiefly applicable to mechanisms provided with helical gearings, and comprising a female element and one or more male elements disposed and movable within said female element and which are constantly in contact with this latter element in any cross section thereof.

In one form of construction, one or all of the elements of a mechanism according to the invention consist of an elastic substance such as India rubber, leather, wood or the like, whose dimensions are such as to assure the pressure of one of the said elements with respect to the other.

Other forms of construction will be set forth in the following description.

In the accompanying drawing, which is given solely by way of example:

Fig. 1 is a lengthwise section of an apparatus provided with helical gearing elements improved according to the invention.

Fig. 2 is a partial horizontal section on the line 2—2 of Fig. 1.

Fig. 3 is a corresponding end view.

Figs. 4, 5 and 6 are partial lengthwise sections of an internal part of the gearing.

Fig. 7 is a cross-section on the line 7—7 of Fig. 6.

Fig. 8 is a cross-section of another form of construction of the internal element of the gearing.

In the form of construction shown in Figs. 1 to 3, the apparatus comprises a stationary element 1 containing a rotary part 2. These two parts 1 and 2 have a helical form. The element 1 has for instance two helical threads or teeth, whilst the rotary part 2 is provided with one thread which in each cross-section of the device is constantly in contact with the surface of the outer element 1.

The pitch of the threads of the parts 1 and 2 may be constant or not. These pitches, for each section, will depend upon the number of teeth.

In conformity to the invention, the outer part 1 consists of an elastic substance such as India rubber, leather or the like. It is held in place by a cylindrical metallic member 3.

Owing to the elasticity of the part 1, all play is practically avoided upon a great length of the line of contact between the parts 1 and 2; and this absence of play will be obviously furthered if the inner part 2 is movable in the outer part 1 without any guiding means. The part 2 may be rotated, as herein represented, by a small flexible member 4, which may if necessary be replaced by a small double-cardan shaft.

Two end-pieces 5—6, which are provided with respective necks 7—8, are connected together by bolts 9 and support the member 3 and the part 1. The end-piece 6 is fitted with a stuffing-box 10 which is pressed by screws 11, and thus the said stuffing-box separates the bearing 12 of the device which may act as a pump, permitting thus a supply of lubricant at 13.

The operation of the pump is the following: Between the two male and female elements are formed suitable closed spaces due to the difference of the numbers of threads on each element. The number of these spaces depends obviously upon the number of threads provided on these gear elements. When one of the gear elements is rotated with respect to the other the said spaces between the elements are displaced in a longitudinal direction and it is evident that if a fluid is contained within them it will be axially transported, the device then functioning as a pump, compressor or the like. The rubber part 1 which is very simple as to manufacture will ensure a perfect tightness between the different parts of the gear elements and a correct functioning of the mechanisms.

It will be observed that all of the above mentioned pieces can be moulded or cast.

In the present construction, the outer part has a length which is equal to one pitch, but it may also have a length equal to several pitches. Portions of elements with reversed pitches may be placed end-to-end in order to overcome the axial thrust.

The internal part 2 may also be made elastic, and in this case the outer part 1 may be elastic or not.

The elasticity of the internal part 2 may be obtained by constructing it with an elastic material, or in any other suitable manner.

In the case the cross-section of the internal part 2 of the device being constantly circular, the elasticity may be obtained by providing the internal part 2a with circular packing rings 14 (Fig. 4) which are optionally split, are very thin, and are in close contact; or further, by surrounding the said part or core 2a by a wire 15 (Fig. 5) or the like, which is wound in a spiral about the said core.

In this case, the diameter of the rings 14 or of the turns of wire 15 should somewhat exceed the diameter of the cross-section of the part 1, in order that a suitable contact may be assured by the yielding of the rings or the wire spires.

It is evident that such rings 14 or wire 15 may be employed in conjunction with the first-mentioned arrangement, by rendering the core 2a of part 2 elastic.

In another arrangement, the internal part 2 is constructed by means of a core 2a upon which is mounted a set of thin circular discs 17 (Figs. 6 and 7) each of which may be displaced as shown in Fig. 7, thus tending to move away from the axis either by the action of a spring, or by centrifugal force. The discs 17 may also be split in order to exert pressure by the increase of their diameter. This latter arrangement may even be employed alone, as shown in Fig. 8.

The part 2 may be further constructed by means of a core 2a, Figs. 6 and 7, upon which is pressed a set of circular textile pieces, the rigidity of which will be assured by centrifugal force.

Whatever be the construction adapted, the part 2 will be preferably given a density which is practically equal to the density of the fluid, in order to obtain a perfect equilibrium. The part 2 will then be enabled to float in the fluid.

It is evident that the principle of the invention is further applicable to mechanisms with ordinary gearings, of all kinds.

Obviously, the said invention is not limited to the forms of construction herein described and represented, which are given solely by way of example.

Having now described my invention what I claim as new and desire to secure by Letters Patent is:

1. A gear mechanism adapted for use as a pump, motor or the like comprising a casing, inlet and outlet conduits in said casing, a female helical gear element inside said casing and a male helical gear element located in this latter and always in contact therewith in any cross section, the number of threads of said female element exceeding by one unit the corresponding number of threads on the male element and one at least of said elements being deformable, thus ensuring a perfect tightness of the joints and providing for a closed tight axial space comprised between said male and female elements and wherein the fluid is contained, said space communicating with said outlet and inlet conduits, and driving means for the rotation of one of said gear elements.

2. A gear mechanism adapted for the use as a pump, motor or the like comprising a casing, outlet and inlet conduits in said casing, a female helical gear element inside said casing and at least one male helical gear element disposed within said female element, the number of threads of the female element exceeding by one unit the corresponding number of threads of the male element, one at least of the inner elements being formed of a core covered by an elastic means, thus ensuring a perfect tightness of the joints and providing for a closed tight axial space comprised between said male and female elements and wherein the fluid is contained, said space communicating with said outlet and inlet conduits, and driving means for the rotation of one of said gear elements.

3. A gear mechanism according to claim 1 the inner male helical gear element having a specific weight which is substantially equal to that of the liquid operated upon by said mechanism.

4. A gear mechanism according to claim 1 further comprising flexible means connnecting the movable parts of said mechanism and said driving means.

5. A gear mechanism according to claim 1 wherein one element at least is made of India rubber.

RENÉ JOSEPH LOUIS MOINEAU.